P. K. SIERT.
CHICKEN BROODER AND GRAIN SPROUTER.
APPLICATION FILED MAY 21, 1914.

1,225,063.

Patented May 8, 1917.
3 SHEETS—SHEET 1.

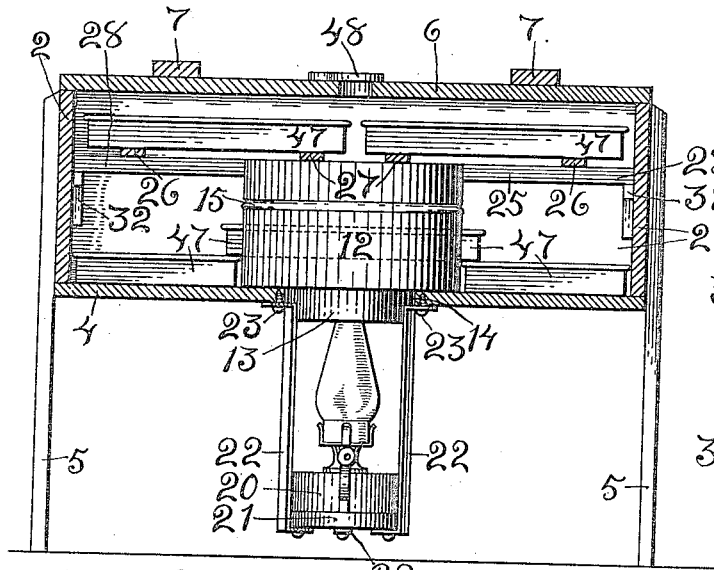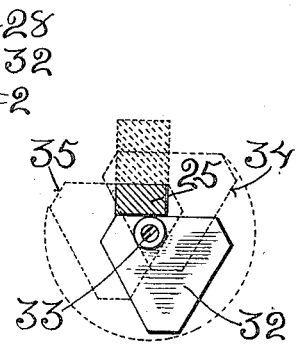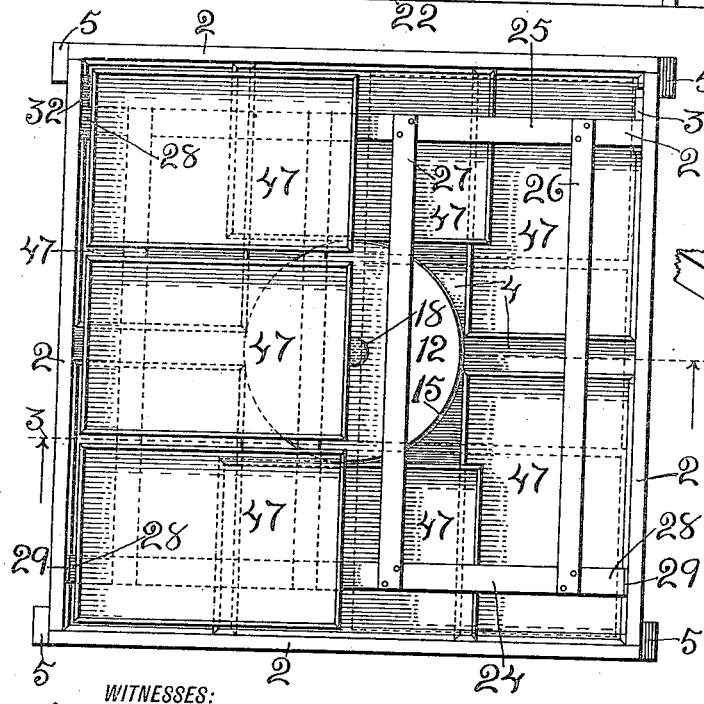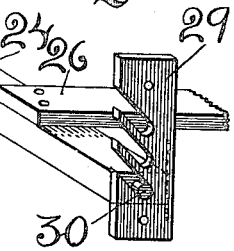

P. K. SIERT.
CHICKEN BROODER AND GRAIN SPROUTER.
APPLICATION FILED MAY 21, 1914.

1,225,063.

Patented May 8, 1917.
3 SHEETS—SHEET 3.

WITNESSES:
Morris Nielsen
George Adolf

INVENTOR
Paul K. Siert,
BY Lou. Vaughan,
his ATTORNEY.

UNITED STATES PATENT OFFICE.

PAUL K. SIERT, OF BLAIR, NEBRASKA.

CHICKEN-BROODER AND GRAIN-SPROUTER.

1,225,063.

Specification of Letters Patent.    Patented May 8, 1917.

Application filed May 21, 1914.   Serial No. 840,066.

*To all whom it may concern:*

Be it known that I, PAUL K. SIERT, a citizen of the United States of America, residing at Blair, in the county of Washington and State of Nebraska, have invented certain new and useful Improvements in Chicken-Brooders and Grain-Sprouters, of which the following is a specification.

My invention relates to improvements in chicken brooders having an artificial heat radiator disposed centrally in the brooder chamber; and the objects of my improvement are, first, to provide a brooder that also may be used as a grain sprouter in preparing a substitute for green food for fowls generally; second, to facilitate proper heating without complicated apparatus that is difficult to manipulate; third, to provide a manner of and means for ventilating, a rectangular brooder chamber having a centrally disposed warming radiator, that will best subserve the requirements in growing young chickens; and fourth, to construct a brooder with all the principal parts separable and readily accessible for cleaning, applying antiseptics and vermicides and that is generally promotive of sanitation.

These objects with others more clearly hereinafter disclosed, I attain by the structure and means illustrated in the accompanying drawings, in which—

Figure 1:
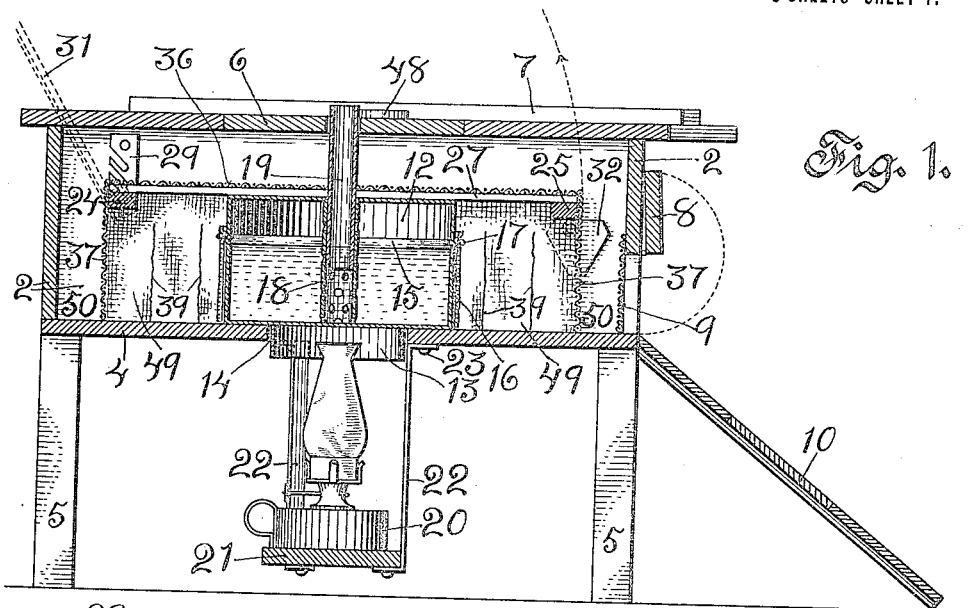
Figure 2:
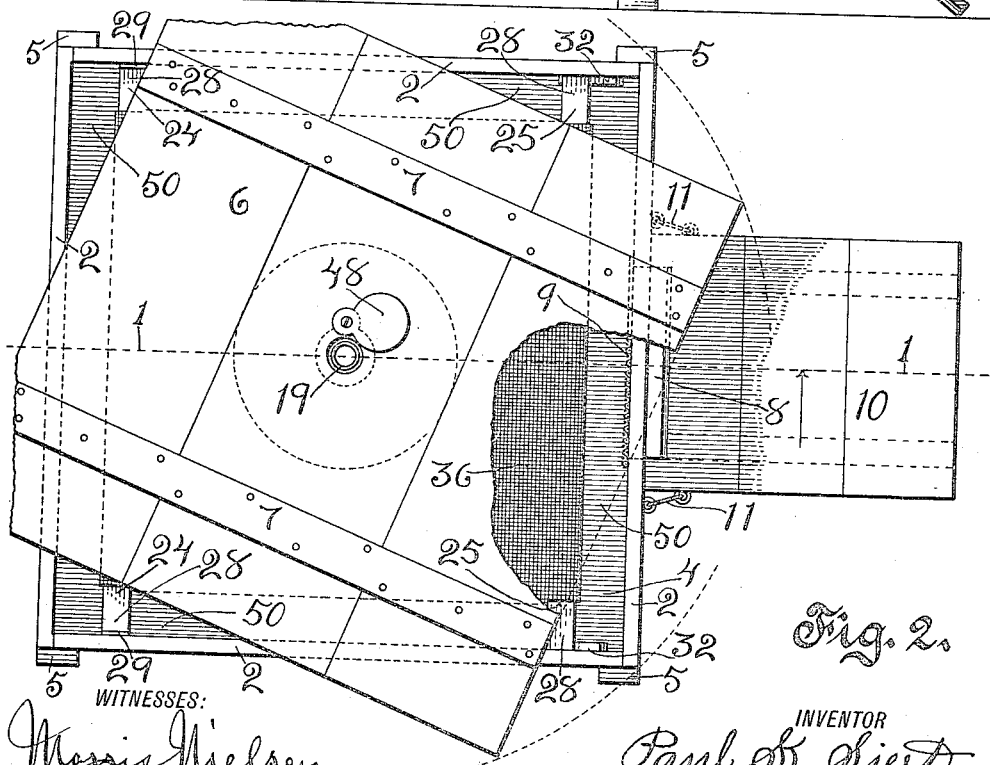
Figure 6:
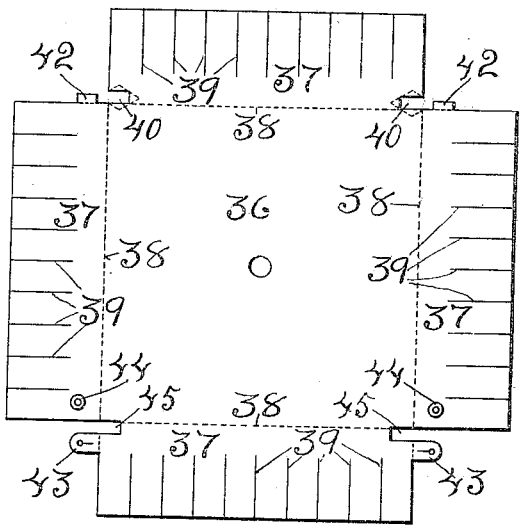
Figure 8:
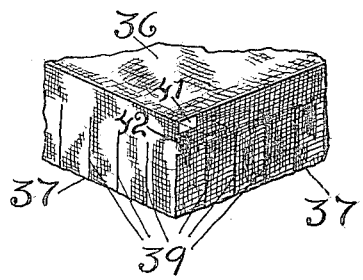
Figure 9:
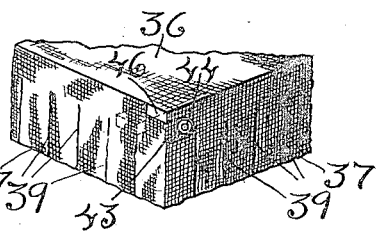
Figure 5:
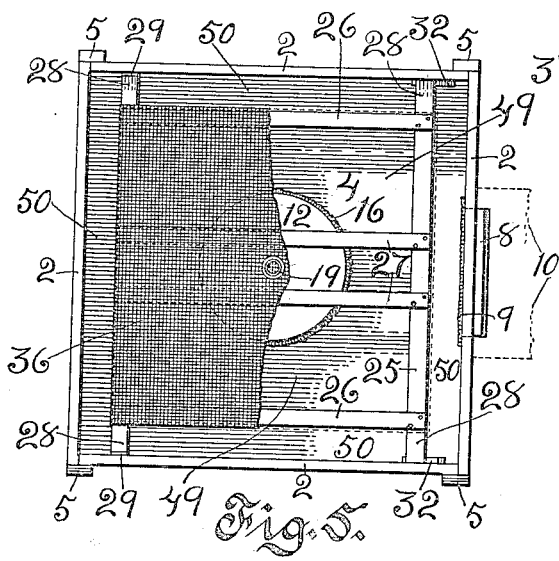
Figure 7:
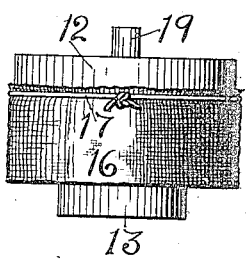

Figure 1 shows a vertical section on the broken line 1 of Fig. 2, when the parts are arranged as a brooder; Fig. 2, is a top view of the same arrangement as in Fig. 1, portions of the revoluble cover cut away, at one place to better show the hover cloth or blanket; Fig. 3, a vertical section substantially on the broken line 3 of Fig. 4, at right angles to Fig. 1, showing the apparatus arranged as a grain sprouter; Fig. 4, a top view of the grain sprouting arrangement with the cover and three of the six top sprouting pans removed; Fig. 5, a top view at smaller scale, of the brooder, the cover removed and about one-half of the hover blanket cut away; Fig. 6, a view of the hover blanket and the integral side hover curtains all cut and laid out flat, before being folded and stitched or buttoned to form the attaching armholes at the corners; Fig. 7, a side elevation of the detached radiator having its insulation skirt on and the escape pipe slid in ready to pack in the brooder chamber for shipping; Fig. 8, a perspective view of a stitched angle forming a corner closed armhole of the hover; Fig. 9, a perspective view of a buttoned angle, forming a corner openable armhole of the hover; Fig. 10, a perspective view showing the back of the multi-hooked pivot-plate, and a seated pintle, applied in pairs for hanging and supporting one edge of the hover frame and grain pan support at different heights; and Fig. 11, an inside elevation of an adjustable-height stop for elevation of the free or swinging edge of the hover frame. In all of which views like reference numerals refer to similar parts.

A rectangular brooder chamber is formed of the four equal vertical side walls 2, having a bottom 4 attached thereto and legs 5 at the corners to cover the angle joints and to support the top at about table height. A square cover 6 has cross battens 7 on its upper surface, leaving its under side smooth to fit and slide on the top edges of the walls. A flap door 8 is disposed to close an opening at the center and bottom of one of the side walls; ingress and egress for the chicks is thus controlled, the door being closed for young broods or when using the chamber for sprouting grain. For a temporary closure, that may be passed by the chicks themselves, the sectionally slitted curtain 9 is suspended across the doorway. An inclined approach 10 leads from the general run, on the yard ground or floor, up to the threshold of the door where it is removably fastened by the hooks and eyes 11.

The radiator consists of a sheet metal vertical cylinder 12 of size to hold a large quantity of water in proportion to the space to be warmed and of height about two-thirds the height of the chamber. The bottom has a concentric circular pendent flange 13 of less diameter than the radiator bottom. When assembled this flange is disposed through a central aperture 14 through the bottom of the chamber, to seat the radiator centrally therein. This radiator is removable at will, being only retained on its seat by the accumulated weight of itself and the content of water. A reverse curve bead 15 intermediate of the height of its curved wall serves to stiffen the wall and attach the insulation skirt 16. The skirt, of coarse fabric, has its shirred top edge drawn into and retained in the bead by the retaining cord 17; and extending to the bottom it prevents the chicks from coming into direct contact with the metal wall of the radiator. A perforated brace tube 18 is disposed axially in the radiator from its bottom up to and open at its top end through the head of the radiator. A vent tube 19 is disposed telescopically in the perforate brace tube, to slide up and extend through the cover, to serve as a pivotal stub axle on which the cover is turned edgewise; it slides into the brace tube to fold for packing and is to be removed by withdrawing it from the tube 18 when the chamber is used for sprouting grain.

The heater comprises a common oil lamp 20 seated on the base 21 of a tripod hanger having its three strap-iron legs 22 bent outwardly at their top ends and removably fastened to the underside of the bottom of the brooder chamber by the wood screws 23. As shown in Fig. 1, the top of the lamp chimney, while it is spaced down from the bottom of the radiator, to allow free draft, stands above the lower edge of the surrounding pendent flange 13. This flange extends below the bottom of the chamber sufficiently to protect the adjacent wooden edges; thus it forms a shallow heat dome, about the head of the chimney, the crown sheet of which dome is the bottom of the radiator. By this means a greater part of the heat is imparted by conduction to the superimposed body of water in the radiator; but, sufficient heat is carried radially outward by the draft of the lamp to properly warm and keep dry the bottom boards of the brooder chamber.

A rectangular rack to support a hover blanket or the top grain pans, consists of the hanging stile 24 and the swinging or stop stile 25, connected by the end rails 26 and the middle rails 27 having their ends fastened on top of the stiles, as shown. The stiles are of length to span the brooding chamber; while the rails are shorter to space the stiles away from the adjacent parallel side walls of the chamber. The end rails are set spaced inwardly from the ends of the stiles; the ends of the stiles thus form the projecting arms 28 at the corners of the rack; and the end rails of the seated rack are thus spaced away from the adjacent side walls of the chamber equally with the stiles, leaving an equal space clear around between the rack and the side walls. The multi-hooked pintle plates 29 are interposed between the ends of the hanging stile arms and the walls to which the plates are fastened. Pintles 30 on the arm ends of this stile, removably seat in either of the three hook-shaped seats of each plate, to hinge and support this edge of the rack at a selected height. When so seated, and the chamber cover is removed, the opposite edge may swing upwardly bringing the rack to the position indicated by the broken lines 31, in Fig. 1. To stop and support the opposite edge of the rack on a level with its hinged edge, the revoluble triangular stops 32 are pivoted on the chamber walls beneath the arm ends of the swinging stile. These stops are shown in the first or lowest position, where the middle rails rest across the top of the radiator. By turning each stop on its pivot screw 33 to its third position, indicated by the dotted lines 34 in Fig. 11, this edge of the rack is supported at its highest level, if the pintles of the opposite edge are seated in the highest hook seats of the pintle plates; or turned to the second position, indicated by the dotted lines 35, the intermediate height is attained; the stops are thus set to agree with the hook seats of the pintle plates to bring the rack level at either selected height.

The hover blanket 36 and the four pendant hover curtains 37, 37, etc., are best made from a single piece of fabric, cut to the shape shown in outline in Fig. 6. The dotted lines 38 indicate the confines of the horizontal top, where the fabric is bent downwardly to form the curtains, which have the vertical slits 39 for convenient passage of the chicks therethrough. The rectangular notches 40 at the ends of one side form armholes 41, when the extension overlaps 42 are stitched onto the end of the adjoining curtains around the corner, as shown in Fig. 8. The buttonhole ears 43 at the ends of the opposite side engaged by the buttons 44 close the notches 45 to form openable armholes 46, as shown in Fig. 9. By slipping the closed armholes over a side pair of arms of the rack the open armholes are then easily closed and buttoned around the opposite pair of arms to attach the hover blanket and curtains; which are obviously as easily removed from the rack for cleaning disinfection or renovation, or when the chamber is to be used for sprouting grain.

The grain pans 47 are shallow sheet metal receptacles, arranged in the chamber in upper and lower sets of six each, as shown in Figs. 3 and 4; the three pans at one side of the top set being omitted from Fig. 4, to disclose the plan of arrangement of the pans of the lower set, around the radiator. The rack supports the top set of pans out of direct contact with the radiator head; and, being removable and swinging it allows the ready removal of those pans containing the grain that is in the most advanced stage of growth, for feeding and the replacing of newly filled pans. The grain placed in the pans for sprouting is moistened. The requisite moisture is preserved and the sprouting facilitated by the removal of the vent tube from the radiator; this allows direct vaporization from the radiator into the chamber; and a swinging closure 48 on the cover, to close the central opening therein, prevents escape of the warm moistened air.

The vertically slitted curtains 37, form a continuous passable partition dividing the brooding chamber into an inner rectangular warm chamber 49, immediately surrounding the radiator, and an outer continuous cool corridor 50 clear around along the outer walls.

To give first care to young chicks, the door at the approach is closed confining them in the brooder. The revoluble cover is turned edgewise on its axle,—the vent pipe of the radiator,—to open triangular spaces for the admission of light and cool fresh air at the angles of the corridor, in each corner of the brooder chamber, as shown in Fig. 2. The sizes of these openings are readily adjusted, by turning the revoluble cover, to meet the requirements of variable conditions. Food and water are placed in the corners, the angles of the corridor, directly beneath these openings. It is obvious that these triangular openings, spaced equally along the corridor, afford even efficient ventilation throughout the chamber. In the advanced stages of development of the chicks the door and approach are utilized; food and water are then supplied outside on the floor of the general run, and the brooder then serves only as a warming retreat and roost.

The curved skirted wall of the circumferentially-large radiator prevents any possibility of central piling by the chicks, if by inadvertence or accident the general temperature has been allowed to fall too low. On the contrary should the radiator become unduly heated, piling cannot result in the remote corners of the warm chamber,—to which corners the chicks first resort if unduly heated and the corridor is too cold,—for the yielding curtain wall allows free passage into the corridor at any point and will open at once if piled against. Such contingencies are quite certainly evaded by the large volume of water in the radiator, making the matter of temperature easily controllable with a simple oil lamp for heating and facilitating the omission of expensive regulators. Further, a fabric supported by an open rack, forms a cover that is to a great degree pervious; this keeps up a continuous beneficial ventilation, which is increased by any rising temperature of the radiator and warm room, supplemental to the action of the large water radiator, to prevent any possibility of sudden changes of temperature in the brooder.

The brooder chamber cover, the hover, the radiator and the lamp, all conveniently removable, leave the open chamber entirely accessible for cleaning, disinfection or renovation. And the further separableness of the hover blanket and curtains from the supporting rack, allows the use of extra hover cloths to make cleaning changes, to keep the brooder in the most sanitary condition.

It is not necessary to remove the rack and hover cloth, they may be simply swung upwardly and outwardly turning on the pivotally-seated edge of the rack, as indicated at 31, in Fig. 1, for removal of the radiator, frequent inspection or cleaning of the floor of the warm chamber and surrounding corridor.

I claim:

1. A device of the character herein described, comprising an elevated rectangular open topped chamber having a centrally apertured bottom, a vertical cylindrical water radiator having a plain bottom end, a pendant flange surrounding a central area of the bottom of said radiator and adapted to project through the aperture to removably seat the radiator, a lamp supported from the underside of the chamber bottom to dispose its chimney top within the flange inclosure on the bottom of the radiator, a perforate brace tube disposed axially in the radiator and having its top end open through the top end of the radiator, a vent tube telescopically slidable in the brace tube, and a revoluble rectangular cover to the chamber having a central aperture to give it a revoluble bearing on said vent tube, a rectangular rack smaller than the chamber and removably supported above the radiator and spaced away from the walls of the chamber, and a removable hover blanket having a central portion to impose on said rack and side portions to hang from the edges of the rack to divide the brooding chamber into a smaller rectangular chamber surrounding the radiator and a surrounding corridor clear around along the outside walls.

2. A device of the character herein described, comprising an open topped rectangular chamber, a water radiator in the chamber, a perforate vertical brace tube in the radiator and its top end open through the top thereof, a vent tube fitted telescopically slidable in said brace tube and adapted to be extended above the open top of the chamber, and a revoluble rectangular cover having an aperture to give it a bearing on the upstanding end of the vent tube and to revolve edgewise sliding on the open top of the chamber.

3. A device of the character herein described, comprising a rectangular chamber having adjustable ventilation openings at the tops of its vertical angles, a closure connected to open and close equally and simultaneously all of said openings, a heat radiator disposed centrally on the floor of said chamber, and a vertically-slitted fabric partition disposed in said chamber, to form a continuous fresh air corridor along its vertical side walls, communicable with said ventilation openings and to form a central warm air chamber around said radiator.

5. A device of the character herein described, comprising a principal open-topped rectangular chamber, a cover pivoted centrally to revolve edgewise and open vents equally and simultaneously at the tops of all vertical angles or corners of said chamber, a vertical cylindrical heat radiator of less height and diameter than said chamber and disposed centrally on the floor thereof, a horizontal support frame disposed over the radiator and spaced below the cover of the principal chamber, a hover blanket on the support frame, and a vertically-slitted curtain suspended from the support frame to form a smaller concentric rectangular warm chamber around the radiator with its angles or corners coincidentally disposed with the vents of the inclosing principal chamber.

5. A device of the character herein described, comprising a chamber, a hover rack of smaller dimensions than the chamber and having stiles with ends projected beyond its edge rails to form supporting arms, and a hover cloth consisting of a central field to lie on the rack and extensions to hang as curtains from the edges thereof and having closed armholes to receive the arms at one edge of the rack and openable armholes to close around the arms at the opposite edge.

In testimony whereof I have affixed my signature in presence of two witnesses.

PAUL K. SIERT.

Witnesses:
MORRIS NIELSEN,
A. F. GRAY.

Copies of this patent may be obtained for five cents each, by addressing the "Commissioner of Patents, Washington, D. C."